Oct. 23, 1928.
B. D. HAYS
1,688,708
SECURING DEVICE FOR FAN PULLEYS AND THE LIKE
Filed Dec. 14, 1923
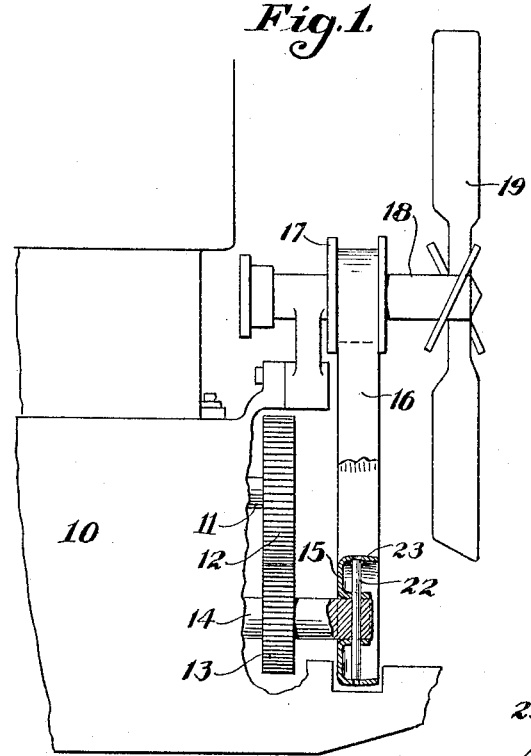
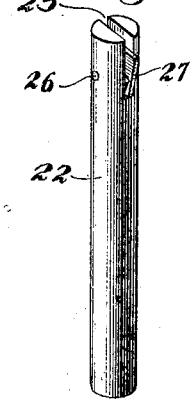
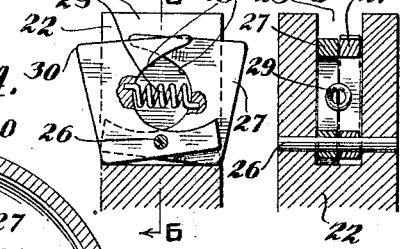
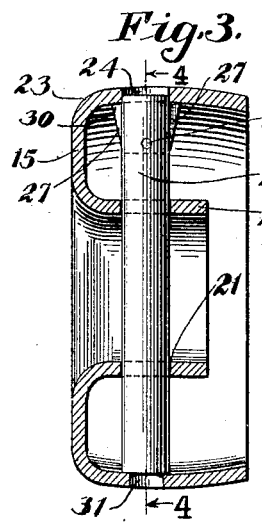
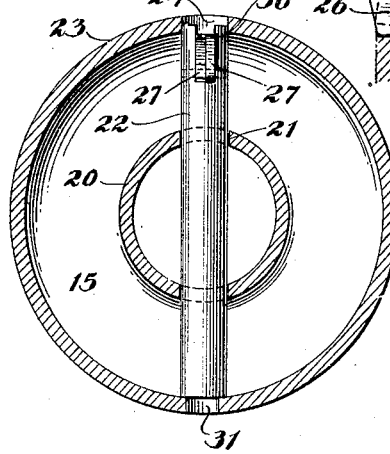
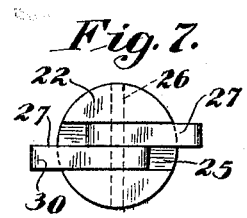
B.D. Hays
INVENTOR Patented Oct. 23, 1928.

1,688,708

UNITED STATES PATENT OFFICE.

B D HAYS, OF GRAND SALINE, TEXAS, ASSIGNOR, BY MESNE ASSIGNMENTS, OF ONE-HALF TO C. A. FISCHER, OF FORT WORTH, TEXAS.

SECURING DEVICE FOR FAN PULLEYS AND THE LIKE.

Application filed December 14, 1923. Serial No. 680,694.

This invention relates to a device designed especially for use on automobile engines for the purpose of securing a fan pulley to the shaft, by which the fan is driven.

These pulleys are usually secured by a pin extending transversely through the shaft and held therein by a cotter pin. The position in which the pulleys are located renders it especially difficult, if not impossible, to insert the cotter pins by which they are usually held, unless the radiator is first removed.

With these facts in mind, it is the object of the present invention to provide means for securing the pulley to the shaft, which includes a pin having self-contained means for automatically locking it in position when it is inserted, but which may be, nevertheless, easily removed whenever desired.

The invention also consists in certain details of construction and combinations thereof which will be more clearly apparent from the following detailed description taken in connection with the accompanying drawing, which illustrates the invention in its preferred form.

In the drawing:

Figure 1 is a side elevation of a portion of an automobile engine embodying the invention, certain parts being broken away and shown in section to better illustrate the invention.

Figure 2 is a perspective view of the improved pin embodied in the invention.

Figure 3 is a diametric section through the pulley, showing the pin in position.

Figure 4 is a transverse section taken substantially on the line 4—4 of Figure 3.

Figure 5 is a detail sectional view of one end of the pulley pin.

Figure 6 is a detail sectional view taken on the line 6—6 of Figure 5.

Figure 7 is an end elevation of the pulley pin.

The invention is illustrated in connection with an automobile engine 10 of well known type, having a forwardly extending shaft 11, provided with a gear 12 meshing with a cooperating gear 13 mounted on a counter shaft 14 having a pulley 15 mounted thereon, which is connected by means of a belt 16 to a pulley 17 mounted on a shaft 18, which carries the fan 19.

The pulley 15 is formed with a hub 20, which is adapted to fit over the end of the shaft 14, and is provided with diametrically opposed apertures 21 adapted to register with a transverse bore through the shaft 14, and to receive a pin 22 for securing the pulley to the shaft. The pulley 15 also has an outer rim 23, which is integrally or otherwise secured to the hub 20, and is provided with an aperture 24 of the same diameter as the apertures 21 and in alinement therewith, so that the pin 22 may be inserted through the aperture 24 for securing the pulley to the shaft. The length of the pin 22 is such that when it is fully inserted, the inner end thereof is in engagement with the inner surface of the rim 23, as best shown in Figures 3 and 4, and the outer end remains within the aperture 24, but terminates short of the outer surface of the rim 23.

The outer end of the pin 22 is provided with a slot 25 extending from side to side of the pin through the longitudinal central line thereof, and extending longitudinally some distance beyond the inner surface of the rim 23 of the pulley. A small pin 26 extends transversely through the pin 22 near the bottom of the slot 25 and perpendicular to the plane of said slot, and is firmly secured by welding or other suitable means. Pivoted on the same pin 26, as shown in Figures 5, 6 and 7, are a pair of latch members 27, angular in form the inner edges of which are spaced from the bottom of the slot 25 sufficiently to permit a limited lateral movement of the latches about their pivots the bottom of said slot acting as a stop to limit the outward or lateral movement of said latch members. The combined thickness of the latches 27 is substantially equivalent to the thickness of the slot 25, and they are mounted side by side upon the pin 26. One edge of each latch member 27 is formed with a concave recess 28. The bottoms of these recesses are opposed to each other, as shown in Figure 5, and form seats for the opposite ends of an expansible coiled spring 29, which normally urges the latches outwardly.

When the latches 27 are pressed inwardly against the pressure of the spring 29, they may be entirely contained within the slot 25, so that the pin may be easily inserted through the aperture 24. When the pin 22 is fully inserted, the outer corners 30 of the latch members spring downwardly within the rim 23, so that the outer edges of the latch members engage the inner surfaces of the rim 23 and hold the pin 22 against removal, and, in fact, against any longitudinal play. The pin 22 may, however, be easily removed when desired by forcing the latch members 27 toward each other entirely into the slot 25 by a pair of pliers, or other suitable tool. An aperture 31, smaller than the apertures 21 and 24, may also be provided adjacent the inner end of the pin 22, whereby a punch or other small tool may be introduced to force the pin out, in case it should become stuck.

From the foregoing description, it will be seen that I have provided a device for the purpose described, which may be easily inserted or removed, which is comparatively inexpensive, and which can not wear out. Although I have described the invention with special reference to the securing of fan pulleys as used on automobile engines, it will be, of course, understood that the invention is not limited thereto, but a similar device may be used for securing any machine element to a shaft by which it is carried. Various modifications may also be made in the details of construction within the scope of what is claimed, without departing from the spirit of the invention or sacrificing any of its advantages.

What is claimed is:

In a device for securing a pulley having a rim and a hub to a shaft, which elements have registering apertures, a main pin formed to have one end thereof inserted through said apertures and having a transverse slot extending through its opposite end, a pair of opposed substantially U-shaped latching members in the slot having the inner side faces of their top and bottom portions in engagement with each other and their outer faces in engagement with the walls defining the sides of the slot, a pivot pin common to both of the members and extending therethrough and connected to the main pin, the bottoms of the members being formed to engage the bottom wall of the slot and the tops thereof being formed to engage the inner face of the pulley rim, and a coil spring between the members connected to both and disposed in the open centers thereof.

In testimony, that I claim the foregoing as my own I have hereto affixed my signature.

B D HAYS.